US012117863B2

(12) United States Patent
Magleby et al.

(10) Patent No.: US 12,117,863 B2
(45) Date of Patent: Oct. 15, 2024

(54) FOUR-AXIS POSITIONAL INPUT DEVICE

(71) Applicant: Avid Technology, Inc., Burlington, MA (US)

(72) Inventors: David K. Magleby, Cupertino, CA (US); William J. Lurie, Alamo, CA (US); Steven H. Milne, Palo Alto, CA (US); Edward Jones, Boulder Creek, CA (US)

(73) Assignee: Avid Technology, Inc., Burlington, MA (US)

( * ) Notice: Subject to any disclaimer, the term of this patent is extended or adjusted under 35 U.S.C. 154(b) by 14 days.

(21) Appl. No.: 18/148,181

(22) Filed: Dec. 29, 2022

(65) Prior Publication Data

US 2024/0219950 A1    Jul. 4, 2024

(51) Int. Cl.
*A63F 13/00* (2014.01)
*G05G 9/047* (2006.01)
*G06F 3/00* (2006.01)
*G06F 3/16* (2006.01)

(52) U.S. Cl.
CPC ............. *G05G 9/047* (2013.01); *G06F 3/165* (2013.01); *G05G 2009/04748* (2013.01); *G05G 2009/04751* (2013.01); *G05G 2009/04777* (2013.01); *G05G 2009/04781* (2013.01)

(58) Field of Classification Search
CPC ...... A63F 13/211; A63F 13/24; A63F 13/285; A63F 2300/1006; A63F 2300/1037; A63F 2300/1043; A63F 2300/105; G06F 3/016
See application file for complete search history.

(56) References Cited

U.S. PATENT DOCUMENTS

2006/0281550 A1* 12/2006 Schena ................... G06F 3/016
463/37
2021/0307850 A1* 10/2021 Barakat .................. A61B 34/30

OTHER PUBLICATIONS

PT-JOY-G3 User Manual, Aug. 2019, p. 11, https://f.hubspotusercontent20.net/hubfs/418770/PTZOptics%20Documentation/PT-JOY-G3/PT-JOY-G3%20User%20Manual.pdf.
JC 2000 Contactless Multi-axis Joystick Datasheet, 2002, p. 5, https://www.farnell.com/datasheets/30691.pdf.
X52 H.O.T.A.S. User Guide, 2017, pp. 3-4, https://www.logitech.com/assets/65328/2/x52-hotas.pdf.
FT Aviator Quick Start Guide, 2019, p. 4, https://fluidity.wpenginepowered.com/wp-content/uploads/2019/07/FT-Aviator-Quick-Start-Guide-Online-Version.pdf.

(Continued)

*Primary Examiner* — Insa Sadio
(74) *Attorney, Agent, or Firm* — Oliver Strimpel

(57) ABSTRACT

A four-axis joystick provides the ability to control four parameters in a single input device. In one embodiment, the Z-direction of control is implemented by a telescoping joystick handle, with the X- and Y-directions of control being implemented by pivoting motions of the handle in directions radial to an axis of the joystick handle, and the theta-direction of control implemented by rotation of a portion of the handle about the handle axis. The four-axis joystick may be used as an input device for audio mixing applications with the X-, Y-, and Z-dimensions of control mapped to panning of an audio source in the left-right, forward-backward, and up-down directions respectively, and the theta-dimension mapped to volume control of low frequency effects.

15 Claims, 2 Drawing Sheets

(56) References Cited

OTHER PUBLICATIONS

Global Resources, Z-Axis JC8000 Joystick 2 Button Assembly Drawing, Mukwonago, WI 53149, https://gsglobalresources.com/uploads/Z-Axis-JC8000-Joystick.pdf.
APEM M-Series Joysticks Datasheet, Aug. 10, 2022, pp. 1-5.
Logitech Extreme 3D Pro, 2003.
Sure Grip JSC Can Series Joystick Datasheet, 2021, pp. 1-2.

* cited by examiner

FOUR-AXIS POSITIONAL INPUT DEVICE

BACKGROUND

Traditional surround-sound formats are two dimensional, with the speakers arranged on a plane with left-to-right (X) and front-to-back (Y) dimensions. Audio mixing consoles provide a joystick to allow film, television, and music mix engineers to position a sound anywhere in the X, Y plane.

New immersive audio formats such as Dolby Atmos®, DTS:X®, and Ambisonics® add speakers in the ceiling—adding a height dimension (Z). For these new three-dimensional formats, film and television mix engineers generally need to use two hands—one on the joystick for X and Y and the second on a knob for Z. Dolby Atmos complicates this by adding a fourth parameter, size, where larger sizes result in the sound source bleeding into adjacent speakers in increasing amounts. Three hands are needed to control all these parameters at once.

There is therefore a need for new input devices to facilitate improved ergonomics and accuracy of operator control of audio mixes.

SUMMARY

A four-axis joystick provides single-handed control over four parameters of a software application or machine. One of the axes is controlled by motion parallel to the length of the joystick handle.

In general, in one aspect, a joystick comprises an elongate handle pivotably supported in an assembly for movement from a rest position in directions radial to an axis of the handle, wherein the handle is rotatable about the axis and extendable and contractable along the axis and, wherein: pivoting motion of the handle along a first direction radial to the axis of the handle is encoded by a first encoder in the assembly; pivoting motion of the handle along a second direction radial to the axis of the handle and orthogonal to the first direction is encoded by a second encoder in the assembly; rotation about the axis of the handle is encoded by a third encoder in the assembly; and extension and contraction along the axis of the handle is encoded by a fourth encoder in the assembly.

Various embodiments include one or more of the following features. Extension and contraction of the handle along the axis is accomplished at least in part by motion of a first portion of the handle with respect to a second portion of the handle. The first portion of the handle comprises a sleeve surrounding the second portion of the handle. The extension and contraction of the handle includes changing an overall length of the handle. Extension and contraction along the axis of the handle is implemented by motion of a portion of the handle with respect to the assembly. The motion of the portion of the handle with respect to the assembly involves rotation of threads on the portion of the handle with respect to the assembly. Extension and contraction along the axis of the handle is implemented without changing an overall length of the handle. Extension and contraction along the axis is driven by a linear actuator within the assembly. The linear actuator drives extension and contraction along the axis using a rack and pinion assembly. The linear actuator drives extension and contraction along the axis using a helical thread-nut mechanism.

In general, in another aspect, a method of mixing audio comprises: providing a computer-based audio mixing application; providing a joystick having four dimensions of control, each dimension of control effected by motion along a corresponding direction of one of angular and linear motion of the joystick, wherein the joystick is in data communication with the computer-based audio mixing application; and enabling a user of the computer-based audio mixing application to use the four-axis joystick to control an apparent physical location an audio source, wherein: a first coordinate of the apparent physical location of the audio source is controlled by a first control dimension of the joystick; a second coordinate of the apparent physical location of the audio source is controlled by a second control dimension of the joystick; and a third coordinate of the apparent physical location of the audio source is controlled by a third control dimension of the joystick.

Various embodiments include one or more of the following features. The first coordinate of the apparent physical location of the audio source is an X-coordinate, the second coordinate of the apparent physical location of the audio source is a Y-coordinate, and the third coordinate of the apparent physical location of the audio source is a Z-coordinate. An angular coordinate of the apparent physical location of the audio source is controlled by a fourth control dimension of the joystick. The angular coordinate of the apparent physical location of the audio source is an azimuthal angle of the apparent physical location of the audio source in a horizontal plane with respect to a listener. A size of the audio source is controlled by a fourth control dimension of the joystick. The fourth dimension of the joystick is a rotary motion of at least a portion of a handle of the joystick. The first and second dimensions of control are effected by motions of a handle of the joystick in directions radial to an axis of a longitudinal axis of the handle and the third dimension of control is effected by extensional or contractional motion of the joystick handle parallel to the longitudinal axis of the joystick handle.

DETAILED DESCRIPTION

The accuracy, speed, and intuitiveness of operator control of audio mixes is enhanced by means of a joystick with four degrees of freedom. The joystick allows a user of a software application to control the values of four parameters of the application with a single input device. Motion along each of the four directions afforded by the joystick may be performed with one hand. We describe an embodiment that may be used for controlling audio mixes, but there are many other applications of the joystick, some of which are mentioned below. As used herein a joystick with four degrees of freedom is referred to as a four-axis joystick. One embodiment of the four-axis joystick is a telescoping joystick in which one of the axes is implemented by extensional and contractional movement of a portion of the joystick handle.

Figure 1:
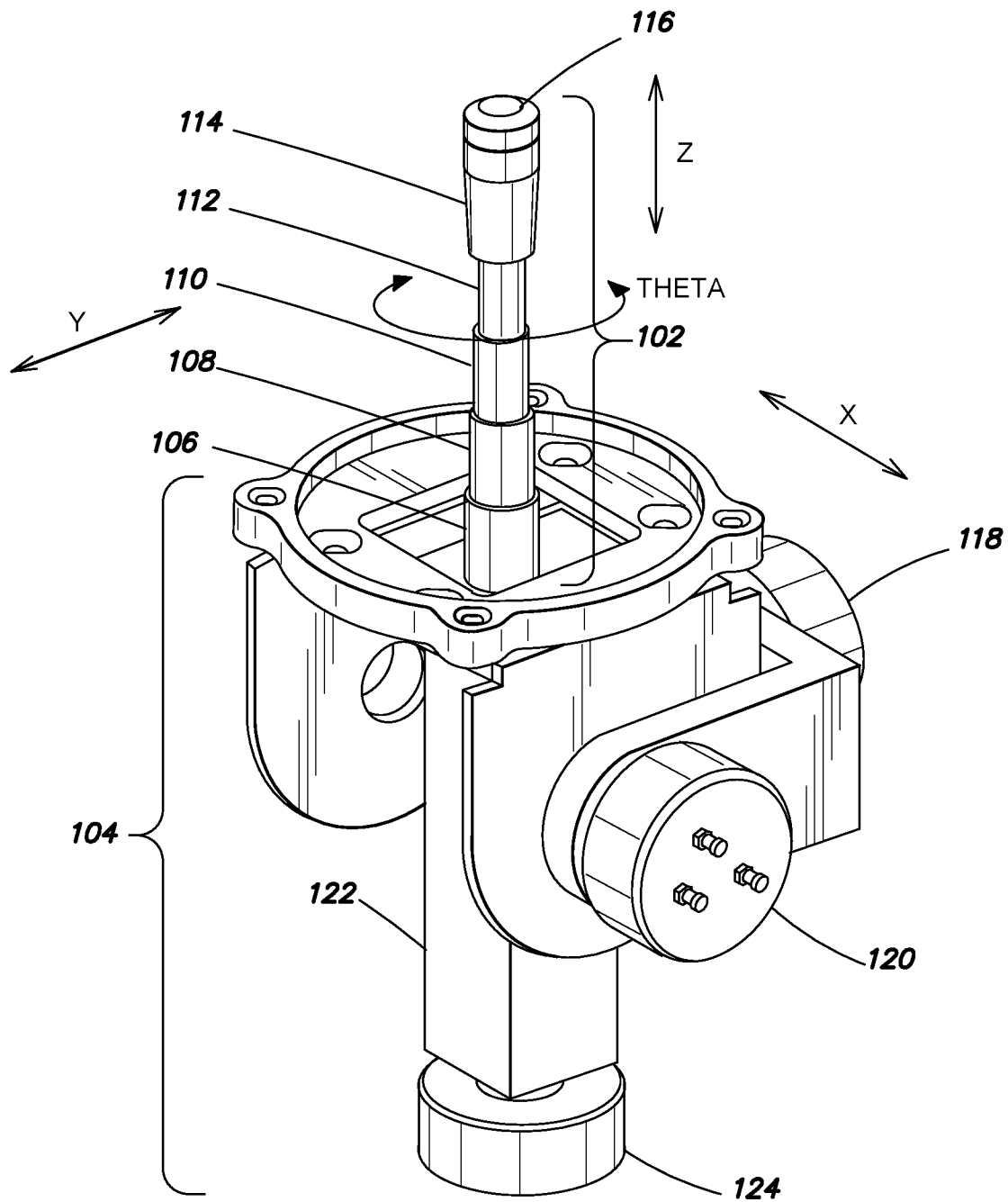
FIG. 1 is a simplified perspective drawing of a telescoping joystick that provides a user with simultaneous control over four parameters.

FIG. 1 is a simplified perspective drawing of a telescoping joystick that provides a user with simultaneous control over four parameters. The parameters are mapped to motion along the four dimensions X, Y, Z, and theta, as indicated in the figure. Joystick handle 102 is pivotably mounted in assembly 104. The handle comprises multiple segments 106, 108, 110, and 112, that together form a tapering telescoping shaft, with successive cylindrical segments starting from the base fitting slidably over neighboring segments. The number of segments may be 2, 3, 4, 5, or more. In some implementations, extension of one or more segments of the handle along the Z direction is accomplished via internal threads and a rotating inner threaded shaft, or by a rack and pinion mechanism. In the described embodiment, the top-most portion 114 of the joystick handle has a somewhat larger diameter than the top-most telescoping portion and includes touch-sensitive tip 116 that may be used to activate the joystick, or turn automation on or off, as in the case of switching on and off of the writing of audio pan parameters. In some implementations, top-most portion 114 is also touch-sensitive. The joystick may include one or more buttons (not shown) to provide additional input controls.

As indicated in FIG. 1, the X-direction motion corresponds to left and right pivoting motion of joystick handle 102. The Y-direction motion corresponds to forward and backward pivoting motion of the joystick handle. As with most joysticks, the pivoting motion may take place in any direction radial to an axis of the joystick handle, with motions that do not lie along the X- or Y-directions having both X and Y components of motion. The Z-direction motion corresponds to elongation or contraction of the joystick handle, which, in the embodiment illustrated in the figure, is accommodated by the sliding the concentric segments of the shaft with respect to each other in an extensional or contractional telescoping manner. In certain embodiments, the Z-direction motion is implemented by motion of the handle with respect to assembly 104. In such embodiments, joystick handle 102 may not comprise multiple telescoping segments, since the Z-direction motion is accommodated by retraction of handle 102 into assembly 104 or extension of the handle from a withdrawn position within the assembly. The theta-direction motion corresponds to a rotary, twisting, or azimuthal motion of at least a portion of joystick handle 102.

Each dimension of the joystick is connected to an encoder that measures the absolute position of the joystick and/or motion along the corresponding dimension. In the described embodiment, assembly 104 includes X-direction mechanism and encoder 118, Y-direction mechanism and encoder 120, Z-direction mechanism and encoder 122, and theta-direction mechanism and encoder 124. In certain implementations the encoders have 200 ticks of resolution, with +/−1-100 ticks in the X and Y directions, 0-100 in the Z direction, and 100 ticks per revolution in the theta dimension.

For each of the four dimensions of control, assembly 104 is equipped with an actuator, which contains a drive assembly that provides motorized motion of the joystick. The X, Y, and theta directions are driven by rotary actuators and the Z direction is driven by a linear actuator. Thus, for example, the middle part of assembly 104 pivots around direction encoder 120 to result in Y-axis motion. When automation is being played back, the actuators move the joystick to reflect the previously recorded time-based parameter values. The use of automation and motorized joysticks in the mixing of audio is well known in the art and is described, for example, in U.S. Pat. No. 6,264,355, which is wholly incorporated herein by reference. The encoders and the actuators may be separate units, or the encoders may be included as integrated elements of the actuators. The actuator motors are driven by a joystick controller. The controller receives data from the encoders indicating the current position of the joystick in the corresponding dimension.

Z-direction motion may be achieved by various mechanisms internal to the joystick assembly, such as rack and pinion, linkage, and a helical thread-nut assembly such as a leadscrew. Extension and contraction of joystick handle 102 is achieved by the upper end of the actuation element, which extends and retracts from the upper end of Z-direction mechanism and encoder 122, directly moving handle segment 114 with respect to assembly 104 and the lowest-most segment of handle 102, which is fixed to Z-axis mechanism and encoder 122. When the Z-axis actuation element travels up or down, the distance between 114 and 106 is increased or decreased, with resulting extension or contraction respectively of the handle. Intermediate segments 108, 110, and 112 of the handle 102 shift along the Z-axis accordingly to fill the gap between segment 106 and segment 114.

In certain embodiments, the joystick handle includes external or internal threads and is rotated with respect to assembly 104 to achieve Z-direction motion. In such embodiments, a tip portion (e.g., FIGS. 1, 114 and 116) is used for theta-direction control, rotating about the handle axis independently of the remainder of the handle. The overall length of the joystick handle may remain fixed, with negative Z-direction motion accommodated by retraction of the handle within the joystick assembly. In such embodiments, extension and contraction of the handle may be achieved by external threads on the handle shaft that are rotated with respect to the assembly. The threads may be on a portion of the handle that rotates with respect to both the housing (to drive the Z-direction motion) and a remaining, upper portion of the handle that does not rotate. A further top portion may be rotatable by the user to achieve theta-direction control. In certain hybrid implementations, the Z-direction of motion is achieved by a combination of extension and retraction of at least a portion of the handle with respect to the assembly, e.g., a base portion nearest assembly 104, while additional motion is accommodated via a telescoping mechanism for other portions of the handle, as described above.

In certain embodiments, the entire joystick assembly may be driven or positioned vertically within a carrier assembly (not shown in the figure) external to the joystick assembly. The carrier assembly includes a drive mechanism and control electronics that enables Z-direction movement of the joystick assembly with respect to the carrier assembly. As with the telescoping embodiment, the drive mechanism may be achieves with a mechanism such as rack and pinion, linkage, and leadscrew.

The motors are used to move the joystick during automation playback when the user is not touching it. In general, when the user touches the joystick, the motor switches off so as not to compete with the user. To facilitate this, the actuators can be back-driven, i.e., they can be manually operated despite being powered mechanisms. When under manual control, the actuator mechanism is driven in reverse, whereas when under electronic control, the actuator is driven from the opposite, i.e., the motor side of the mechanism.

The four-axis joystick enables an operator to control four different parameters of a software application with a single hand. Unlike gesture-based input devices that require the user to move their hand or whole arm around, the joystick only requires smaller movements. Furthermore, the movements may be ergonomically tailored to the user's needs and allow their palm or wrist to rest on a surface, such as a mixing console bolster, while operating the joystick. This ergonomic advantage is especially valuable for professional audio mixers who may be using the device for many hours at a stretch. When not in use, the joystick may be parked in a retracted position to minimize control surface obstruction.

The four-axis joystick may be used to control a variety of software applications and physical objects. In many situations, an intuitive mapping is made between each direction of motion of the joystick and a corresponding motion in what is being controlled. We now describe some exemplary applications.

As mentioned above, immersive audio formats such as Dolby Atmos and Ambisonics add speakers in the ceiling—adding a height dimension (Z). An example of Dolby Atmos is 7.1.2 surround sound, with 7 channels in the walls, 1 subwoofer (bass) channel, and 2 channels in the ceiling. For such three-dimensional formats, film and television mix engineers may map the X, Y, and Z directions of the four-axis joystick to the left/right position, front/rear position, and height of a sound source respectively within the theater space. The theta direction may be mapped to low frequency effects (LFE), with anticlockwise motion lowering the amount of low-frequency (bass) boost to the sound source, and clockwise motion increasing the bass. Another mapping of theta-direction motion is to the rotation of a sound source about the listener's head. For example, the sound of a buzzing bee may be rotated about the listener's head using the theta-direction motion of the joystick. In an alternative mapping, the theta-direction motion is mapped to the size of a sound source, for example with anticlockwise motion reducing the size of a source and clockwise motion increasing the size. Example of sound sources of differing sizes and control thereof via augmented reality is described in U.S. Pat. No. 10,466,960, which is wholly incorporated herein by reference. For both the rotation and size applications, the apparent changes to the sound source being edited are achieved by changing the relative volumes of the loudspeakers positioned around the walls and ceiling of a theater. For example, for a source orbiting clockwise (viewed from above) about the listener's head in a horizontal plane, the maximum volume is sequentially directed to speakers mounted in the left wall, front wall, right wall, and back wall of the theater. When changing the size, the smaller or more distant a sound source is, the fewer the number of speakers used for that sound. Conversely, a large (or nearby) sound source is produced by bleeding the sound into multiple speakers around the one closest to the center of the source.

Figure 2:
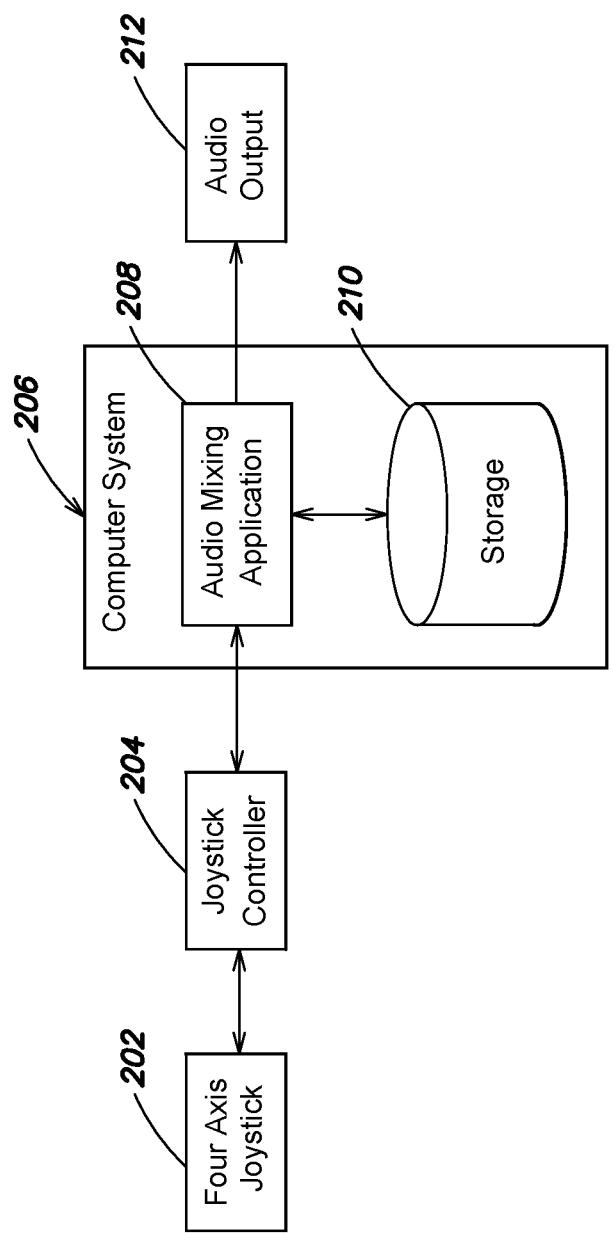
FIG. 2 is a high-level block diagram of a system for using the telescoping joystick as an input device for audio mixing applications.

FIG. 2 is a high-level block diagram of a system for using the four-axis joystick for audio mixing applications such as those described above. Four-axis joystick 202 is connected to joystick controller 204, which receives data from the encoders in the joystick and sends electrical signals to control the motors within the joystick actuators. The joystick controller generates data in a form that can be sent via a data connection to computer system 206, which hosts audio mixing application 208. The application is able to input the data received from the joystick controller which serves to control the values of up to four audio mixing parameters. The audio mixing application may be a digital audio workstation (DAW) or a live audio mixer. An example of a DAW is Pro Tools®, a product of Avid Technology, Inc. of Burlington, Massachusetts. Examples of systems for live audio mixing are the VENUE product family, which are also products of Avid Technology, Inc. The four-axis joystick may be integrated into a control surface that includes various other physical and virtual controls for audio mixing. An example of such a control surface is the Avid S6™, a large control surface product of Avid Technology Inc. In some implementations, the control surface is modular in nature, as described in U.S. Pat. No. 10,191,607, which is wholly incorporated herein by reference. The music project that is being mixed may be stored on storage 210 internal to the host system (as shown) or externally (not shown), either on the premises or remotely. The computer system is connected to audio output 212, such as headphones or loudspeakers, enabling the audio engineer to monitor the mix.

In an exemplary audio mixing use case, the four dimensions controlled by the joystick are mapped to audio parameters as follows. The X-, Y-, and Z-directions each control one direction of movement of a sound source for three-dimensional (e.g., surround sound) panning of the source. For example, the X-direction is used to pan left and right, the Y-direction is used to pan forward and backwards, and the Z-direction is used to pan up and down. The theta-dimension may be mapped to increasing and decreasing the volume of low-frequency effects (LFE).

In one use case, during playback of audio by audio mixing application 208, as the user grabs the joystick, touch sensor 116 tells the audio application to start writing and storing timestamped left/right X, forward/back Y, pan Z, and size parameters to storage 210. When the user releases the joystick, the absence of touch on sensor 116 tells audio mixing application 208 to stop writing the parameters. These parameters can later be played back by the audio mixing application 208 at the same times that they were recorded relative to the start of the media.

The four-axis joystick may be used for video camera positioning. In one mapping, the X-direction is mapped to camera tilt, the Y-direction to camera pan, motion controlling tilt, and the Z-direction controlling the raising and lowering of the camera on a boom mount. The theta direction is used to control a camera setting or is not used.

The four-axis joystick may be used in a variety of applications. In one example use, the joystick is used to control a character in video game, with the X control moving the character left/right, Y moving the character forward/backward, Z moving the character up and down, and theta changing the orientation or (i.e., rotating) the character. Other exemplary uses of the joystick include control of a radio-controlled airplane, operating a drone, controlling an industrial machine such as a crane, forklift, or agricultural machine, and piloting a helicopter.

Various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A joystick comprising:
an elongate handle pivotably supported in an assembly for movement from a rest position in directions radial to an axis of the handle, wherein the handle is rotatable about the axis and extendable and contractable along the axis, wherein extension and contraction of the handle along the axis is accomplished at least in part by motion of a first portion of the handle with respect to a second portion of the handle and, wherein:
pivoting motion of the handle along a first direction radial to the axis of the handle is encoded by a first encoder in the assembly;
pivoting motion of the handle along a second direction radial to the axis of the handle and orthogonal to the first direction is encoded by a second encoder in the assembly;
rotation about the axis of the handle is encoded by a third encoder in the assembly; and
extension and contraction along the axis of the handle is encoded by a fourth encoder in the assembly.

2. The joystick of claim 1, wherein the first portion of the handle comprises a sleeve surrounding the second portion of the handle.

3. The joystick of claim 1, wherein the extension and contraction of the handle includes changing an overall length of the handle.

4. The joystick of claim 1, wherein extension and contraction along the axis of the handle is implemented by motion of a portion of the handle with respect to the assembly.

5. The joystick of claim 4, wherein the motion of the portion of the handle with respect to the assembly involves rotation of threads on the portion of the handle with respect to the assembly.

6. The joystick of claim 1, wherein extension and contraction along the axis is driven by a linear actuator within the assembly.

7. The joystick of claim 6, wherein the linear actuator drives extension and contraction along the axis using a rack and pinion assembly.

8. The joystick of claim 6, wherein the linear actuator drives extension and contraction along the axis using a helical thread-nut mechanism.

9. A method of mixing audio, the method comprising:
providing a computer-based audio mixing application;
providing a joystick having four dimensions of control, each dimension of control being effected by motion along a corresponding direction of one of angular and linear motion of the joystick, wherein one of the four dimensions of control is effected by extension and contraction of a handle of the joystick, the extension and contraction being accomplished at least in part by motion of a first portion of the handle with respect to a second portion of the handle, and wherein the joystick is in data communication with the computer-based audio mixing application; and
enabling a user of the computer-based audio mixing application to use the four-axis joystick to control an apparent physical location an audio source, wherein:
a first coordinate of the apparent physical location of the audio source is controlled by a first control dimension of the joystick;
a second coordinate of the apparent physical location of the audio source is controlled by a second control dimension of the joystick; and
a third coordinate of the apparent physical location of the audio source is controlled by a third control dimension of the joystick.

10. The method of claim 9, wherein the first coordinate of the apparent physical location of the audio source is an X-coordinate, the second coordinate of the apparent physical location of the audio source is a Y-coordinate, and the third coordinate of the apparent physical location of the audio source is a Z-coordinate.

11. The method of claim 9, wherein an angular coordinate of the apparent physical location of the audio source is controlled by a fourth control dimension of the joystick.

12. The method of claim 11, wherein the angular coordinate of the apparent physical location of the audio source is an azimuthal angle of the apparent physical location of the audio source in a horizontal plane with respect to a listener.

13. The method of claim 9, wherein a size of the audio source is controlled by a fourth control dimension of the joystick.

14. The method of claim 13, wherein the fourth dimension of the joystick is a rotary motion of at least a portion of the handle of the joystick.

15. The method of claim 9, wherein the first and second dimensions of control are effected by motions of the handle of the joystick in directions radial to a longitudinal axis of the handle and the third dimension of control is effected by extensional or contractional motion of the joystick handle parallel to the longitudinal axis of the joystick handle.

* * * * *